(12) United States Patent
Griffin et al.

(10) Patent No.: US 12,450,601 B2
(45) Date of Patent: *Oct. 21, 2025

(54) DERIVED UNIQUE TOKEN PER TRANSACTION

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 18/513,168

(22) Filed: Nov. 17, 2023

(65) Prior Publication Data

US 2024/0086909 A1 Mar. 14, 2024

Related U.S. Application Data

(63) Continuation of application No. 17/379,509, filed on Jul. 19, 2021, now Pat. No. 11,823,183, which is a (Continued)

(51) Int. Cl.
*H04L 9/32* (2006.01)
*G06F 21/62* (2013.01)
(Continued)

(52) U.S. Cl.
CPC ....... *G06Q 20/385* (2013.01); *G06F 21/6263* (2013.01); *G06Q 20/12* (2013.01);
(Continued)

(58) Field of Classification Search
None
See application file for complete search history.

(56) References Cited

U.S. PATENT DOCUMENTS 6,128,391 A 10/2000 Denno et al.
7,319,987 B1 1/2008 Hoffman et al.
(Continued)

OTHER PUBLICATIONS

Brier et al., "A Forward-Secure Symmetric-Key Derivation Protocol How to Improve Classical DUKPT", ASIACRYTP 2010, LNCS 6477, pp. 250-267.
(Continued)

*Primary Examiner* — Fatoumata Traore
(74) *Attorney, Agent, or Firm* — Foley & Lardner LLP

(57) ABSTRACT

Example implementations include a method for using tokens between two entities including a client device and a server, by generating, by a first one-way function of the client device, a first intermediate value from a transaction count corresponding to a number of transactions involving an original data, the first intermediate value being unique to a first verification transaction at a server, generating, by a second one-way function of the client device, a second intermediate value from the first intermediate value, the second intermediate value being unique to a second verification transaction at the server, sending, by the client device, a first token based on the first intermediate value to the server to execute the first verification transaction, and sending, by the client device, a second token based on the second intermediate value to the server to execute the second verification transaction.

20 Claims, 5 Drawing Sheets

Related U.S. Application Data continuation of application No. 16/439,325, filed on Jun. 12, 2019, now Pat. No. 11,080,699, which is a continuation of application No. 15/600,512, filed on May 19, 2017, now Pat. No. 10,438,198.

(51) Int. Cl.
*G06Q 20/12* (2012.01)
*G06Q 20/38* (2012.01)
*G06Q 20/40* (2012.01)

(52) U.S. Cl.
CPC ..... *G06Q 20/3829* (2013.01); *G06Q 20/4012* (2013.01); *H04L 9/3213* (2013.01)

(56) References Cited

U.S. PATENT DOCUMENTS

| | | | |
|---|---|---|---|
| 7,353,388 | B1 | 4/2008 | Gilman et al. |
| 7,526,652 | B2 | 4/2009 | Ziegler |
| 7,548,621 | B1* | 6/2009 | Smith ............... H04L 9/0625 |
| | | | 713/194 |
| 8,737,623 | B2 | 5/2014 | Hart |
| 9,106,633 | B2 | 8/2015 | Carnes |
| 9,191,208 | B2 | 11/2015 | Yagisawa |
| 9,461,973 | B2 | 10/2016 | Barnett et al. |
| 10,326,803 | B1 | 6/2019 | Haney |
| 10,581,611 | B1 | 3/2020 | Osborn et al. |
| 10,679,212 | B2 | 6/2020 | Hayhow et al. |
| 11,050,555 | B2 | 6/2021 | Liu |
| 2002/0198848 | A1* | 12/2002 | Michener ............. G07C 9/23 |
| | | | 713/168 |
| 2003/0188158 | A1 | 10/2003 | Kocher |
| 2004/0044739 | A1 | 3/2004 | Ziegler |
| 2008/0040285 | A1* | 2/2008 | Wankmueller ..... G06Q 20/3674 |
| | | | 705/67 |
| 2008/0189214 | A1 | 8/2008 | Mueller et al. |
| 2008/0208758 | A1 | 8/2008 | Spiker et al. |
| 2010/0125509 | A1* | 5/2010 | Kranzley ........... G06Q 20/3263 |
| | | | 705/17 |
| 2011/0307710 | A1 | 12/2011 | McGuire et al. |
| 2012/0191615 | A1 | 7/2012 | Schibuk |
| 2013/0168450 | A1 | 7/2013 | Von Mueller et al. |
| 2013/0198519 | A1 | 8/2013 | Marien |
| 2013/0254117 | A1 | 9/2013 | Von Mueller et al. |
| 2014/0108172 | A1 | 4/2014 | Weber et al. |
| 2014/0164254 | A1 | 6/2014 | Dimmick |
| 2014/0258132 | A1 | 9/2014 | Swamy et al. |
| 2015/0019442 | A1* | 1/2015 | Hird .................... H04W 12/041 |
| | | | 726/30 |
| 2015/0046340 | A1 | 2/2015 | Dimmick |
| 2015/0142665 | A1* | 5/2015 | Dicker ................ G06Q 20/385 |
| | | | 705/64 |
| 2015/0142670 | A1 | 5/2015 | Zloth et al. |
| 2015/0199682 | A1 | 7/2015 | Kalgi et al. |
| 2015/0270961 | A1 | 9/2015 | Barnett et al. |
| 2015/0332283 | A1* | 11/2015 | Witchey ................ G16H 10/60 |
| | | | 705/3 |
| 2015/0339664 | A1* | 11/2015 | Wong ................. H04L 63/0823 |
| | | | 705/71 |
| 2016/0020906 | A1 | 1/2016 | Nolte et al. |
| 2016/0027017 | A1* | 1/2016 | Chitragar ........... G06Q 20/3829 |
| | | | 705/71 |
| 2016/0063781 | A1 | 3/2016 | Whytock et al. |
| 2016/0125376 | A1 | 5/2016 | Beatty et al. |
| 2016/0189136 | A1 | 6/2016 | Mercille |
| 2016/0203496 | A1 | 7/2016 | Guerrero et al. |
| 2016/0330027 | A1 | 11/2016 | Ebrahimi |
| 2017/0147975 | A1 | 5/2017 | Natarajan et al. |
| 2019/0188703 | A1 | 6/2019 | Murray |
| 2019/0243961 | A1 | 8/2019 | Ollivier |
| 2019/0312720 | A1 | 10/2019 | Liu |

OTHER PUBLICATIONS

Herrero-Collantes, Miguel, and Juan Carlos Garcia-Escartin. "Quantum random number generators." Reviews of Modern Physics 89.1 (2017): 015004. (Year: 2017).

MagTek Mobile Payment Devices are Now iPhone 7 Ready, PRWeb ebooks, Seal Beach, CA; Sep. 12, 2016. http://www.prweb.com/releases/2016/09/prweb13676398.htm; 2 pages.

Saha et al., "Applicability of DUKPT Key Management Scheme to Cloud Wallet and other Mobile Payments", International Journal of Computer Applications, Dec. 2014, 6 pages.

Sitek, Albert; "One-Time Code Cardholder Verification Method in Electronic Funds Transfer Transactions", Annales UMCS Informatica AI XIV, 2 (2014), pp. 46-59.

* cited by examiner

DERIVED UNIQUE TOKEN PER TRANSACTION

CROSS-REFERENCE TO RELATED PATENT APPLICATIONS

This application is a continuation of U.S. patent application Ser. No. 17/379,509, titled "DERIVED UNIQUE TOKEN PER TRANSACTION" and filed on Jul. 19, 2021, which application is a continuation of U.S. patent application Ser. No. 16/439,325, titled "DERIVED UNIQUE TOKEN PER TRANSACTION" and filed on Jun. 12, 2019, which application is a continuation of U.S. patent application Ser. No. 15/600,512, titled "DERIVED UNIQUE TOKEN PER TRANSACTION" and filed on May 19, 2017, now U.S. Pat. No. 10,438,198 issued Oct. 8, 2019, which are incorporated by reference herein in their entireties.

BACKGROUND

Tokenization creates a pseudonym (e.g., a token) for an original data element. The token can be used in lieu of the original data element for communication or storage. Many tokenization systems offer a detokenization component, which often includes a token vault. The token vault is a database of tokens and original data elements. Currently, a Token Service Provider (TSP) is not the sole controller of the token vault. For example, in order to generate a payment token (e.g., a tokenized Primary Account number (PAN) for a bank card), the PAN is sent to a corresponding payment network (e.g., Visa, MasterCard, and the like). A token is returned and stored on the cardholder's device (e.g., a mobile device) and used for future transactions. Upon an payment authorization request being received by an issuer (e.g., a financial institution), the token is used to find the PAN, and the PAN is used to find the cardholder's profile to determine whether the transaction should be authorized. Each financial institution manages a token vault even though the token is issued by the payment networks. For example, storing tokens within a token vault with the original data elements makes the token vault a high-risk target.

SUMMARY

In some arrangements, a method for using tokens between two entities including a client device and a server, by generating, by a first one-way function of the client device, a first intermediate value from a transaction count corresponding to a number of transactions involving an original data, the first intermediate value being unique to a first verification transaction at a server, generating, by a second one-way function of the client device, a second intermediate value from the first intermediate value, the second intermediate value being unique to a second verification transaction at the server, sending, by the client device, a first token based on the first intermediate value to the server to execute the first verification transaction, and sending, by the client device, a second token based on the second intermediate value to the server to execute the second verification transaction.

In some arrangements, a client device includes a network interface, and a processing circuit configured to generate, by a first one-way function of the client device, a first intermediate value from a transaction count corresponding to a number of transactions involving an original data, the first intermediate value being unique to a first verification transaction at a server, generate, by a second one-way function of the client device, a second intermediate value from the first intermediate value, the second intermediate value being unique to a second verification transaction at the server, send, by the client device, a first token based on the first intermediate value to the server to execute the first verification transaction, and send, by the client device, a second token based on the second intermediate value to the server to execute the second verification transaction.

In some arrangements, a server includes a network interface, and a processing circuit configured to receive, at the server, a first token based on a first intermediate value, the first intermediate value being based on a transaction count corresponding to a number of transactions involving an original data, the first intermediate value being unique to a first verification transaction at the server, and the first intermediate value being generated by a first one-way function of the client device, receive, at the server, a second token based on the second intermediate value, the second intermediate value being based on the first intermediate value, the second intermediate value being unique to a second verification transaction at the server, and the second intermediate value being generated by a second one-way function of the client device, execute a first verification transaction based on the first token, and execute a second verification transaction based on the second token.

These and other features, together with the organization and manner of operation thereof, will become apparent from the following detailed description when taken in conjunction with the accompanying drawings.

DETAILED DESCRIPTION

Referring generally to the FIGS., apparatuses, systems, and methods described herein relate to deriving, communicating, and verifying a Derived Unique Token Per Transaction (DUTPT). In some arrangements, a token generated using a DUTPT method is used once per transaction and is individually unique to that transaction. Different, non-repeated tokens are derived from the same original data. In other words, tokens derived from the same original data for separate transactions are each unique to a corresponding one of the separate transactions.

The tokens can be communicated between a client device and a server, with the server verifying the authenticity of the tokens received from the client device. In some arrangements, a client device does not need to store the original data or used tokens. In some arrangements, the server stores the original data. In some arrangements, the server does not need to store any tokens. In other words, the server can function as a TSP without any token storage.

Traditional token solutions require a token vault at the server for storing millions of tokens for thousands of clients/customers, making the token vault a rich target. Using the original data (e.g., a payment card number) directly for communication poses great risk given that the original data can be intercepted during communication. Using static tokens in lieu of the original data is less risky but is problematic. On the other hand, by using the DUTPT in the manner described, risk of fraud can be reduced or eliminated because each token is never repeated. Any repeated use of a same token is deemed a known fraud attempt. The fraud window is therefore drastically limited to a per-transaction-basis. Accordingly, the results of the tokenization process are unpredictable, making the system more difficult to break.

Figure 1:
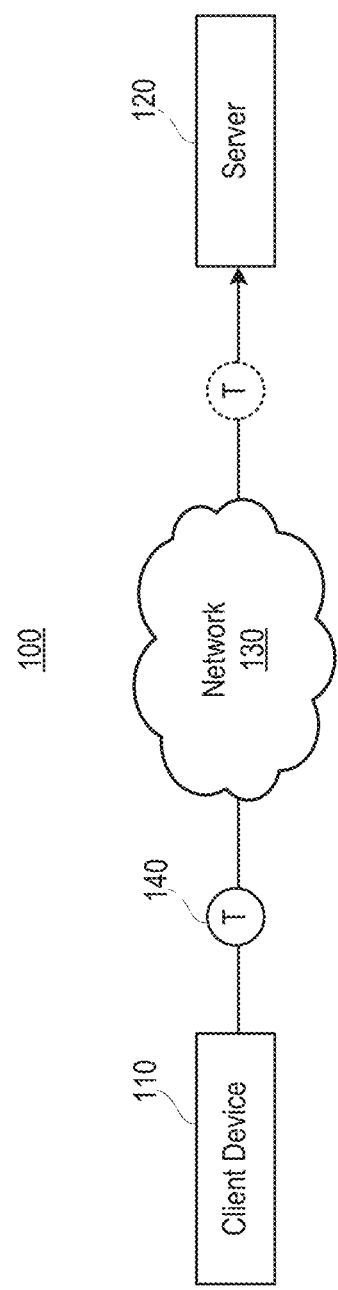
FIG. 1 is a diagram of a system for generating, communicating, and verifying tokens between a client device and a server, according to some arrangements.

FIG. 1 is a diagram of a system 100 for generating, communicating, and verifying tokens between a client device 110 and a server 120, according to some arrangements. Referring to FIG. 1, the system 100 includes at least the client device 110 and the server 120. Each of the client device 110 and the server 120 is a computing system having processing, storage, and networking capabilities for generating, communicating, and/or verifying tokens (e.g., a token 140). In particular, the client device 110 can transmit the token 140 to the server 120 for verification. The token 140 is a DUTPT in the manner described. The token 140 can be derived from the original data and is communicated in lieu of the original data between the client device 110 and the server 120.

The original data can be any type information. Examples of original data include, but are not limited to, a payment card number (e.g., a credit card number, a debit card number, and the like), a financial account number, a password, social security number, a name, an address, an email address, or any Personally Identifiable Information (PII). In some examples, the original data can be a security object (e.g., a key, a certificate, and the like). In some examples, the original data can be a seed for key-generation (e.g., for generating a One-Time-Password (OTP)). The examples of the original data presented herein are not intended to be an exhaustive list of all possible implementations. The original data refers to any information that needs protection during transmission and storage.

The client device 110 is a device that can initiate transactions for which tokens (e.g., the token 140) need to be generated. Examples of the client device 110 include, but not limited to, a mobile device, a smartphone, a laptop computer, a tablet, a desktop computer, a point-of-sale (POS) device, an Automatic Teller Machine (ATM), and the like. In some arrangements, the same original data (e.g., a payment number) can be associated with multiple transactions. Illustrating with a non-limiting example, payment transactions in different instances using the same payment card number can be initiated via the client device 110. Other types of transactions (such as, but not limited to, exchange security objects can be likewise implemented. A user (e.g., a customer, a merchant, and the like) can initiate the transaction by providing corresponding user input. In some arrangements, the client device 110 does not store the original data or used tokens. The client device 110 can derive the tokens (e.g., the token 140) on an ad hoc basis, responsive to each transaction. In some arrangements, the client device 110 stores a local copy of the original data.

The server 120 is a computing system that can verify the authenticity of the token 140 received from the client device 110. In some arrangements, the server 120 stores the original data from which the token 140 is derived. In some arrangements, the server 120 does not store any tokens. The server 120 can derive the tokens (e.g., the token 140) on an ad hoc basis, responsive to each transaction. In other words, the server 120 can function as a TSP without any token storage. Illustrating with a non-limiting example, the server 120 can be a financial institution computing system of a financial institution that issues a bank card (e.g., a credit card, a debit card, and the like) to the user of the client device 110. The server 120 can authenticate or approve transactions initiated by the user by verifying the tokens (e.g., the token 140) corresponding to those respective transactions. In some arrangements, the server 120 generates the original data (e.g., a payment card number) and sends the original data to the client device 110 via the network 130.

The network 130 is any suitable Local Area Network (LAN), Wide Area Network (WAN), or a combination thereof. For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 130 is structured to permit the exchange of data, values, instructions, messages, and the like.

Figure 2B:
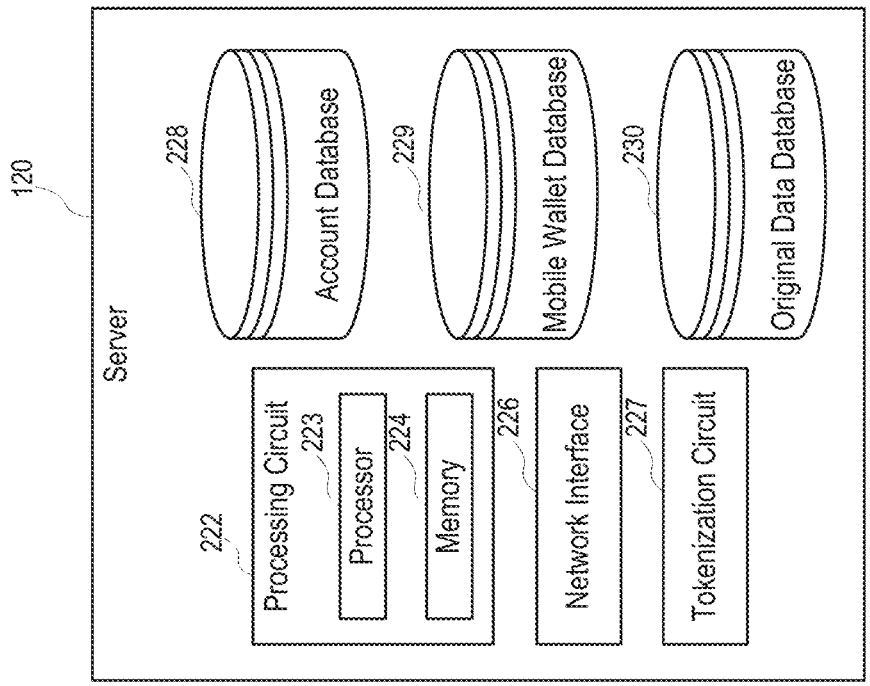
FIG. 2B is a diagram of an example of the server of the system set forth in FIG. 1, according to some arrangements.
Figure 2A:
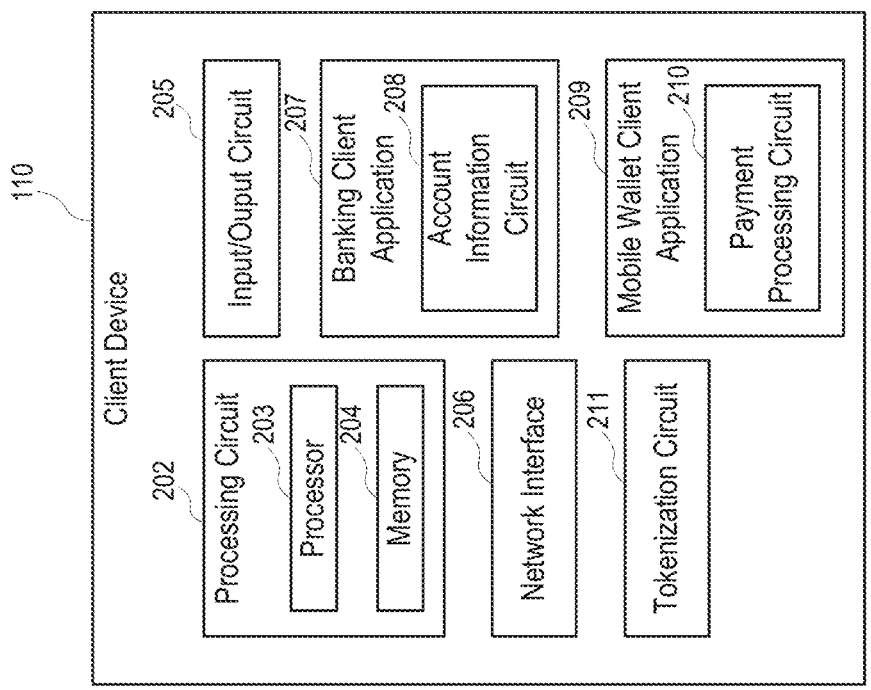
FIG. 2A is a diagram of an example of the client device of the system set forth in FIG. 1, according to some arrangements.

FIG. 2A is a diagram of an example of the client device 110 of the system 100 set forth in FIG. 1, according to some arrangements. Referring to FIGS. 1-2A, the client device 110 is shown to include various circuits and logic for implementing the operations described herein. More particularly, the client device 110 includes one or more of a processing circuit 202, an input/output circuit 205, a network interface 206, a banking client application 207, a mobile wallet client application 209, and a tokenization circuit 211. While various circuits, interfaces, and logic with particular functionality are shown, it should be understood that the client device 110 includes any number of circuits, interfaces, and logic for facilitating the operations described herein. For example, the activities of multiple circuits are combined as a single circuit and implemented on a same processing circuit (e.g., the processing circuit 202), as additional circuits with additional functionality are included.

In some arrangements, the client device 110 includes a processing circuit 202 having a processor 203 and memory 204. The processor 203 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 204 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein. In some arrangements, the memory 204 stores various security keys, such as, but not limited to, a public key of the server 120, a private key of the client 110, and the like. In some arrangements, the memory 204 stores a transaction counter that corresponds to a number of times transactions are initiated and/or completed using the original data.

The input/output circuit 205 is configured to receive user input from and provide information to the user. In this regard, the input/output circuit 205 is structured to exchange data, communications, instructions, etc. with an input/output component of the client device 110. Accordingly, in some arrangements, the input/output circuit 205 includes an input/output device such as a display device, touchscreen, keyboard, microphone, and/or the like. In arrangements in which the client device 110 is a POS device or an ATM, the input/output circuit 205 can include one or more of a payment card reader, a barcode reader, a Bluetooth device, a Near Field Communication (NFC) reader, and the like for receiving information from a customer. In some arrangements, the input/output circuit 205 includes communication circuitry for facilitating the exchange of data, values, messages, and the like between the input/output device and the components of the client device 110. In some arrangements, the input/output circuit 205 includes machine-readable media for facilitating the exchange of information between the input/output device and the components of the client device 110. In still another arrangement, the input/output circuit 205 includes any combination of hardware components (e.g., a touchscreen), communication circuitry, and machine-readable media.

The network interface 206 is configured for and structured to establish connection with the server 120. The network interface 206 is structured for sending and receiving of data over a communication network (e.g., the P2P network). Accordingly, the network interface 206 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

One or more of the banking client application 207 and the mobile wallet client application 209 are server-based applications executable on the client device 110. In this regard, the user of the client device 110 has to first download the application(s) prior to usage. In another arrangement, the banking client application 207 and/or mobile wallet client application 209 are coded into the memory 204 of the client device 110. In still another arrangement, the banking client application 207 and/or mobile wallet client application 209 are web-based interface applications. In this configuration, the user has to log onto or otherwise access the web-based interface before usage. In this regard, at least one of the banking client application 207 and mobile wallet client application 209 is supported by a separate computing system comprising one or more servers, processors, network interface modules, etc. that transmit the applications for use to the client device 110. In certain arrangements, one or more of the banking client application 207 and/or mobile wallet client application 209 include an Application Protocol Interface (API) and/or a Software Development Kit (SDK) that facilitate integration of other applications. All such variations and combinations are intended to fall within the spirit and scope of the present disclosure.

The banking client application 207 is communicably coupled to the server 120 (e.g., an account database 228 of FIG. 2B) and is structured to permit management of at least one account of the user via the banking client application 207. In this regard, the banking client application 207 provides displays indicative of account information, such as, but not limited to, current account balances, pending transactions, profile information (e.g., contact information), reward associated with the account, bill pay information, and/or the like. Further, in some arrangements, the banking client application 207 is configured to process payments from the user to a designated recipient. In some examples, a bill pay option is provided by the banking client application 207, where the bill pay option allows the user to pay his/her bills in response to user input. Accordingly, the banking client application 207 can be used to initiate transactions.

As mentioned herein, the user pays bills (e.g., mortgage, etc.), views balances, pays merchants, and otherwise manages their account via the banking client application 207. Accordingly and as shown, the mobile bank client application 207 includes an account information circuit 208. The account information circuit 208 is linked or otherwise coupled to one or more accounts held by the user and permits management of the associated accounts (e.g., transfer balances between accounts, view payment history, etc.) by communicating with the server 120. The banking client application 207 is communicably coupled to the mobile wallet client application 209. As such, in response to a mobile payment via the mobile wallet client application 209, the mobile wallet client application 209 causes the banking client application 207 to update the payment account (i.e., the account that supported the mobile payment). As such, the applications 207 and 209 are communicably coupled to each other to enable actions supported by each respective application.

The mobile wallet client application 209 is communicably coupled to the server 120 (e.g., a mobile wallet database thereof) and is structured to facilitate purchases by the user via the mobile wallet client application 209. Accordingly, the mobile wallet client application 209 is linked or otherwise connected with one or more accounts of the user. In the arrangements in which the client device 110 is a customer's mobile device, when at a POS terminal, the user initiates the mobile wallet client application 209 and provides a passcode (e.g., biometrics such as a thumbprint, a Personal Identification Number (PIN), a password, etc.) to authenticate the user and select the source payment account desired (e.g., a checking account from a particular financial institution that is linked to the mobile wallet client application 209). Via communication with the payment terminal (e.g., via near field communication), the aforementioned payment information is provided to the POS terminal or the merchant (e.g., via NFC, via barcode presentment, etc.), and the payment is processed. Beneficially, carrying payment cards is avoided or reduced via the mobile wallet client application 209. Accordingly, the mobile wallet client application 209 can be used to initiate transactions.

As mentioned herein, the mobile wallet client application 209 is structured to facilitate and permit payments by interfacing with a user's account managed by the server 120. Accordingly, the mobile wallet client application 209 is communicably coupled via the network interface 206 over the network 130 to the server 120. As shown, the mobile wallet client application 209 includes a payment processing circuit 210 structured to facilitate payments by the user via the mobile wallet client application 209. For example, the payment processing circuit 210 enables a quick-pay capability with a merchant. In this regard, the payment processing circuit 210 includes or is communicably coupled with a communication device (e.g., a near-field communication chip) that facilitates the exchange of information between the mobile wallet client application 209 and a POS terminal.

The tokenization circuit 211 is executed by the processing circuit 202 in some arrangements. The tokenization circuit 211 can derive tokens (e.g., the token 140) based on the original data in the manner described. The server 120 can provide the tokenization circuit 211 in various manners. In some arrangements, the tokenization circuit 211 is a server-based application executable on the client device 110. In this regard, the user of the client device 110 has to download the tokenization circuit 211 from the server 120 or another application download server prior to usage. In some arrangements, the tokenization circuit 211 is a web-based interface application provided by the server 120. In this configuration, the user has to log onto or otherwise access the web-based interface before usage. In this regard, the server 120 transmits the tokenization circuit 211 to the client device 110. In some arrangements, the tokenization circuit 211 includes an API and/or an SDK provided by the server 120 that facilitates integration with other applications. In other arrangements, the tokenization circuit 211 is coded into the memory 204 of the client device 110. All such variations and combinations are intended to fall within the spirit and scope of the present disclosure.

The tokenization circuit 211 is operatively coupled to one or more of the components of the client device 110. For example, the tokenization circuit 211 is operatively coupled to the network interface 206 for communicating with the server 120. The tokenization circuit 211, as facilitated by the network interface 206, can send tokens, such as, but not limited to, the token 140 to the server 120. In some examples, the tokenization circuit 211 is coupled to the input/output circuit 205 to display output and receive user input.

FIG. 2B is a diagram of an example of the server 120 of the system 100 set forth in FIG. 1, according to some arrangements. Referring to FIGS. 1-2B, the server 120 is shown to include various circuits and logic for implementing the operations described herein. More particularly, the server 120 includes one or more of a processing circuit 222, a network interface 226, a tokenization circuit 227, an account database 228, a mobile wallet database 229, and an original data database 230. While various circuits, interfaces, and logic with particular functionality are shown, it should be understood that the server 120 includes any number of circuits, interfaces, and logic for facilitating the operations described herein. For example, the activities of multiple circuits are combined as a single circuit and implemented on a same processing circuit (e.g., the processing circuit 222), as additional circuits with additional functionality are included. In some arrangements, the processing circuit 222 has a processor 223 and memory 224.

The network interface 226 is configured for and structured to establish connection with the client devices 110. The network interface 226 is structured for sending and receiving of data over a communication network (e.g., the P2P network). Accordingly, the network interface 226 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The tokenization circuit 227 can be implemented with the processing circuit 222 or a separate processing circuit such as, but not limited to, the processing circuit 222. In some arrangements, the tokenization circuit 211 can derive tokens based on the original data in the manner described. In some arrangements, the tokenization circuit 211 can verify tokens (e.g., the token 140) in the manner described. In some arrangements, the tokenization circuit 227 provides tokenization functionalities to the client device 110. Illustrating with a non-limiting example, the tokenization circuit 227 provides a server-based application to be downloaded by the client device 110. Illustrating with another non-limiting example, the tokenization circuit 227 provides a web-based application to be accessed by the client device 110. The tokenization circuit 227 can provide APIs and/or SDKs to the client device 110.

The tokenization circuit 227 is operatively coupled to one or more of the components of the server 120. For example, the tokenization circuit 227 is operatively coupled to the network interface 226 for communicating with the client device 110. The tokenization circuit 227 as facilitated by the network interface 226 can receive tokens (e.g., the token 140) from the client device 110.

The account database 228 that stores customer information and account information relating to one or more accounts held by the user or customer of the client device 110 with the server 120. In this regard, more than one financial institution with an associated financial institution computing system can be communicably coupled to the components of FIG. 2B over the network 130 to access the accounts held by the user or customer. The account database 228 stores transaction history of transactions using one or more accounts with, for example, the banking client application 270, the mobile wallet client application 280, or with other suitable applications.

The mobile wallet account database 229 stores mobile wallet accounts of users, including the user or customer of the client device 110. The mobile wallet accounts permit payments via a mobile wallet client application 209 of the client device 110. The mobile wallet account database 229 stores transaction history of transactions made by the user or customer using the mobile wallet client application 209.

The original data database 230 stores the original data. In some arrangements, the original data database 230 stores relationships (e.g., in a lookup table) between the original data and unique identification. The unique identification can be used to identify corresponding original data.

Figure 3:
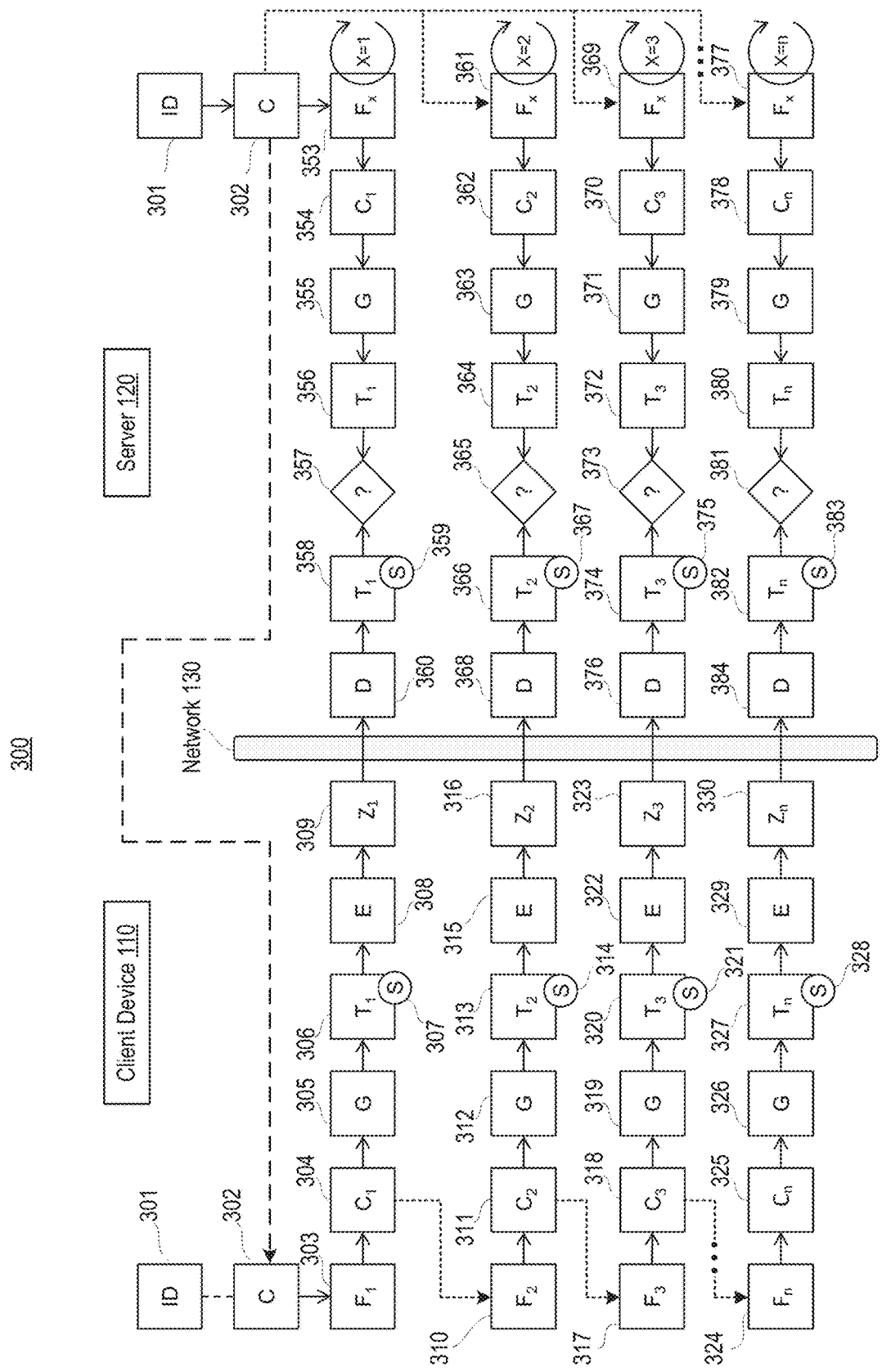
FIG. 3 is a flow diagram illustrating a method for generating, communicating, and verifying tokens between a client device and a server, according to various arrangements.

FIG. 3 is a flow diagram illustrating a method 300 for generating, communicating, and verifying tokens between the client 110 (FIGS. 1 and 2A) and the server 120 (FIGS. 1 and 2B), according to various arrangements. Referring to FIGS. 1-3, the method 300 illustrates an example of generating, communicating, and verifying tokens (e.g., one or more of the tokens or the encrypted tokens 306, 309, 313, 316, 320, 323, 327, 330, 356, 364, 372, and 380), and each of the tokens is unique to a transaction involving the original data. One of ordinary skill in the art can appreciate that other arrangements of generating, communicating, and verifying tokens that are each unique to a transaction involving the original data can be implemented. In some arrangements, one or more of the tokens or the encrypted tokens 306, 309, 313, 316, 320, 323, 327, and 330 can be the token 140 that is sent from the client 110 to the server 120 via the network 130 for verification at the server 120.

In some arrangements, two different functions are used to derive a token from the original data to assure that the token is unique to a given transaction involving the original data.

In some arrangements, the first function (and/or iterations thereof) and the second function are stringed together. A first function (F) is a repetitive one-way function. A one-way function returns a result corresponding to an input in a forward operation. In a reverse operation, it is computationally complex or almost impossible to use the one-way function to derive the input using the result. The first function can be iterated multiple times for synchronizing the derived tokens in the manner described.

In some arrangements, the first function is a one-way hash function. Illustrating with a non-limiting example, the first function can be a SHA-256 hash function. Illustrating with another non-limiting example, the first function can be a Hash-based Message Authentication Code (HMAC) function. The client 110 and the sever 120 can securely establish a symmetric key and use it for the HMAC function. The symmetric key can be updated periodically (e.g., daily, hourly, or the like).

A second function (G) can be used for forward secrecy and prevents discovery of any intermediary values and the original data. In some arrangements, the second function (G) is executed one time. In other arrangements, the second function (G) is executed two or more times. In such arrangements, a second counter records the number of iterations that the second function (G) is executed. The second counter can be transmitted to the server 120 with the token such that the server 120 can have knowledge of the number of iterations that the second function (G) is executed, if that number is not 1 by default. The second function (G) is different than the first function (F). In some arrangements, the second function is a one-way function. In some arrangements, the second function is a one-way hash function. Illustrating with a non-limiting example, the second function can be a SHA-256 hash function. Illustrating with another non-limiting example, the second function can be a HMAC function. As described, the client 110 and the sever 120 can securely establish a same symmetric key and use it for the HMAC function. The symmetric key can be updated periodically (e.g., daily, hourly, or the like).

In the examples shown, second functions (G) 305, 312, 319, 326, 355, 363, 371, and 379 are the same function executed for different transactions and/or by a different one of the devices 110 and 120.

The client device 110 is associated with a unique ID 301 (e.g., a unique identification number, an account number, an email address, a phone number, or the like) that uniquely identifies the client device 110, a user associated with the client device 110, one or more financial accounts associated with the client device 110, and/or the like. In some arrangements, the unique ID 301 is known by the user of the client device 110. In some arrangements, the client device 110 receives the unique ID 301 from the server 120. The server 120 can store the unique ID 301 in one or more of the memory 224, the account database 228, the mobile wallet database 229, or the original data database 230. The unique ID 301 corresponds to original data (C) 302.

The original data (C) 302 is transmitted from the server 120 to the client device 110 via an out-of-network data exchange. In some examples, the original data (C) 302 can be shared using any suitable data exchange. For example, the server 120 can send a credit card including the original data (C) 302 (e.g., a payment card number) to the user who can later operate the client device 110 for financial transactions. The data exchange involving the original data (c) 302 is out-of-network because the payment card number is transmitted by sending the payment card number (identified on a physical credit card) to the user through the mail, whereas subsequent data exchanges involve data transmissions between the client deice 110 and the server 120 via the network 130. In other examples, the server 120 can notify the client device 110 of the original data (C) 302 in any suitable manner, physically or electronically. In some arrangements, the unique ID 301 does not need to be stored on the client device 110 and can be entered via the input/output circuit 205 every transaction. In this regard, the unique ID 301 can be deleted after the unique ID 301 is used per transaction (e.g., after the unique ID 301 is sent to the server 120). In some arrangements, the unique ID 301 can be stored in the memory 204 of the client device 110.

A user of the client device 110 can initiate transactions. A transaction refers to any authorization process for which the original data (C) 302 needs to be verified at the server 120 at a given moment in time. Illustrating with a non-limiting example, a transaction includes using a payment card number to purchase goods or services in a given moment in time (e.g., at checkout). Subsequent instances in which the same payment card number is used correspond to subsequent transactions based on the same original data (C) 302.

Illustrating with a non-limiting example, the user can input, using the input/output circuit 205, the original data (C) 302 (e.g., a payment card number) for the banking client application 207, the mobile wallet client application 209, or any suitable digital transaction processes or applications. In this regard, the user can input the original data (C) 302 to set up the banking client application 207, the mobile wallet client application 209, or any suitable digital transaction processes or applications. Illustrating with another non-limiting example, the user can swipe, scan, or insert the credit card to the client device 110 (which is configured as a POS device or an ATM) for the client device 110 to determine the payment card number.

As shown, for the first time that the original data (C) 302 is used for a transaction (e.g., X=1), the original data (C) 302 is used as input to a first function ($F_1$) 303, which is the first function (F) being iterated one time. An intermediate value ($C_1$) 304 is the output of the first function ($F_1$) 303. In some arrangements, the original data (C) 302 does not need to be stored on the client device 110. During setting up the banking client application 207, the mobile wallet client application 209, or any suitable digital transaction processes or applications, the original data (C) 302 is used to determine the intermediate value ($C_1$) 304, which is stored in the memory 204 instead of the original data (C) 302 in some arrangements. Upon initiation of the transaction (X=1), the intermediate value ($C_1$) 304 is used as input to a second function (G) 305, to initiate the verification process. In some arrangements, the original data (C) 302 is deleted after the intermediate value ($C_1$) 304 is determined. The intermediate value ($C_1$) 304 can be stored used to determine other intermediate values in the manner described for subsequent transactions, thus allowing the original data (C) 302 to be deleted after the first use for transaction (X=1). The intermediate value ($C_1$) 304 is used as input to the second function (G) 305, which outputs the token ($T_1$) 306. In some arrangements, the token ($T_1$) 306 is transmitted via the network 130 to the server 120 for authentication, without a digital signature or additional encryption.

In some arrangements, the client device 110 generates a digital signature (S) 307 on the token ($T_1$) 306 with a private key associated with the client device 110. In some arrangements, the token ($T_1$) 306 with the digital signature (S) 307 is transmitted via the network 130 to the server 120 for authentication, without additional encryption. To further protect tokens during transmission over the network 130, the client device 110 can encrypt tokens and the server 120 can decrypt the token. Encryption functions (E) 308, 315, 322, and 329 are the same function executed for different transactions. In some arrangements, the token ($T_1$) 306 (with or without the digital signature (S) 307) can be encrypted using any suitable encryption function (E) 308 with a public key (e.g., a public certificate) associated with the server 120. The encryption function (E) 308 outputs an encrypted token ($Z_1$) 309. In some arrangements, generating the digital signature (S) 307 and encrypting the token ($T_1$) 306 using the encryption function (E) 308 can be combined. In some examples, SigncryptedData can be used to combine generating the digital signature (S) 307 and encrypting the token ($T_1$) 306 using the encryption function (E) 308, which in this case is a signcryption function. The encrypted token ($Z_1$) 309 is transmitted via the network 130 to the server 120 for authentication.

The client device 110 transmits a transaction counter that corresponds to a number of times that the original data (C) 302 is used for a transaction with the server 120. The transaction counter is sent with the corresponding token 306 or the corresponding encrypted token 309. For the transaction (X=1), the transaction counter is 1.

Upon receiving the token 306 or the encrypted token 309 and the transaction counter, the server 120 derives a server-derived encrypted token 356 or 358 using the original data (C) 302 associated with the unique ID 301, and the transaction counter. The server 120 compares the token 306 or the encrypted token 309 received from the client device 110 with the server-derived token ($T_1$) 356 generated by the server 120. The server 120 verifies the transaction if the token 306 or the encrypted token 309 matches the server-derived token ($T_1$) 356. The server 120 does not need to store any tokens, as with existing tokenization systems. Instead, the server 120 stores only the original data (C) 302 associated with the unique ID 301.

The server 120 can determine the original data (C) 302 by searching for data corresponding to the unique ID 301. Given that the original data (C) 302 is determined based on the unique ID 301, multiple servers can execute the verification processes described herein as long as these servers have access to the same backend database (e.g., the original data database 230), even without prior knowledge of the client device 110. The transaction counter received from the client device 110 indicates a number of iterations that the first function (F) is executed. For example, a first function ($F_x$) 353 is executed for one iteration given that the associated transaction counter is 1 (e.g., X=1). Thus, the first function ($F_x$) 353 is the first function (F) run one time. Thus, the first function ($F_x$) 353 and the first function ($F_1$) 303 are synchronized using the transaction counter. Given that the transaction counter is a mere number and is not sensitive data, the client device 110 and the server 120 can be synchronized without the server 120 keeping count of the number of transactions requested/approved based on the original data (C) 302.

The original data (C) 302 is used as an input to the first function ($F_x$) 353 (X=1), which outputs an intermediate value ($C_1$) 354. The intermediate value ($C_1$) 354 should be the same as the intermediate value ($C_1$) 304, assuming a proper match. The intermediate value ($C_1$) 354 is used as input to second function (G) 355, which outputs a server-derived token ($T_1$) 356. The second function (G) 355 can be executed one or multiple times. In the arrangements in which the second function (G) 355 is executed multiple times, the server 120 receives the second counter from the client device 110 and executes the second function (G) 355 a number of iterations indicated by the second counter.

In some arrangements in which the encrypted token ($Z_1$) 309 is received via the network 130 from the client device 110, the server 120 inputs the encrypted token ($Z_1$) 309 into a decryption function (D) 360, which outputs a token ($T_1$) 358. The decryption function (D) 360 uses a private key associated with the server 110 to decrypt the encrypted token ($Z_1$) 309. In arrangements in which the token ($T_1$) 306 (with or without the digital signature (S) 307) is received instead of the encrypted token ($Z_1$) 309, decryption using the decryption function (D) 360 is not needed. The decryption functions (D) 360, 368, 376, and 384 are the same function executed for different transactions.

In some arrangements in which the token ($T_1$) 358 obtained as a result of the decryption function (D) 360 has a digital signature (S) 359 (307) attached thereto or the token ($T_1$) 306 received from the client device 110 has a digital signature (S) 359 (307) attached thereto, a public key (e.g., a public certificate) associated with the client device 110 can be used to verify the digital signature (S) 359 (307) before comparison at 357. Responsive to determining that the signature fails to verify, the transaction (X=1) is rejected. In the arrangements in which the token ($T_1$) 306 is received without the digital signature (S) 359 (307), signature verification is not needed.

At 357, the server 120 compares the server-derived token ($T_1$) 356 to the received token ($T_1$) 358, in some arrangements. In some arrangements in which the token ($T_1$) 306 instead of the encrypted token ($Z_1$) 309 is received, the server 120 compares the server-derived token ($T_1$) 356 to the received token ($T_1$) 306. If the server-derived token ($T_1$) 356 is the same as the received token ($T_1$) 358 or 306, then the transaction (X=1) can be authorized.

Responsive to determining that the received token ($T_1$) 358 or 306 does not match the server-derived token ($T_1$) 356, the transaction (X=1) is rejected. Otherwise, responsive to determining that the received token ($T_1$) 358 or 306 matches the server-derived token ($T_1$) 356, the original data (C) 302 has been validated.

As shown, for a second transaction, the intermediate value ($C_1$) 354 is used as an input to a first function ($F_2$) 310, which is another iteration of the first function (F). This effectively corresponds to the first function (F) being iterated two times with the original data (C) 302 as input. The original data (C) 302 does not need to be used for security reasons, given that the original data (C) 302 has been deleted after the intermediate value ($C_1$) 304 is determined. Even when an unauthorized party obtains the client device 110 and obtains the intermediate value ($C_1$) 304, it would be difficult to derive the original data (C) 302 given that the first function (F) is a one-way function.

An intermediate value ($C_2$) 311 is the output of the first function ($F_2$) 310. The intermediate value ($C_2$) 311 is used as input to a second function (G) 312, which outputs the token ($T_2$) 313. As described herein, the second function (G) 312 can be executed one time or multiple times. The intermediate value ($C_2$) 311 replaces the intermediate value ($C_1$) 304 as the current intermediate value to be stored. The transaction counter increases by 1 (X=2). In some arrangements, the token ($T_2$) 313 is transmitted via the network 130 to the server 120 with a corresponding transaction counter (X=2) for authentication, without a digital signature or additional encryption.

In some arrangements, the client device 110 generates a digital signature (S) 314 on the token ($T_2$) 313 with a private key associated with the client device 110. In some arrangements, the token ($T_2$) 313 with the digital signature (S) 314 is transmitted via the network 130 to the server 120 with a corresponding transaction counter (X=2), without additional encryption. In some arrangements, the token ($T_2$) 313 (with or without the digital signature (S) 314) can be encrypted using any suitable encryption function (E) 315 with a public key (e.g., a public certificate) associated with the server 120. The encryption function (E) 315 outputs an encrypted token ($Z_2$) 316. In some arrangements, generating the digital signature (S) 314 and encrypting the token ($T_2$) 313 using the encryption function (E) 315 can be combined using, for example, SigncryptedData. In some arrangements, the encrypted token ($Z_2$) 316 is transmitted via the network 130 to the server 120 with a corresponding transaction counter (X=2).

The server 120 can determine the original data (C) 302 by searching for data corresponding to the unique ID 301. The transaction counter received from the client device 110 is a number of iterations that the first function (F) is executed. For example, a first function ($F_x$) 361 is executed for two iterations given that the associated transaction counter is 2 (e.g., X=2). Thus, the first function ($F_x$) 361 is synchronized with the first function ($F_2$) 310. The original data (C) 302 is used as an input to the first function ($F_x$) 361 (X=2), which outputs an intermediate value ($C_2$) 362. The intermediate value ($C_2$) 362 is used as input to a second function (G) 363, which outputs a server-derived token ($T_2$) 364. As described herein, the second function (G) 363 can be executed one time or multiple times.

In some arrangements in which the encrypted token ($Z_2$) 316 is received via the network 130 from the client device 110, the server 120 inputs the encrypted token ($Z_2$) 316 into a decryption function (D) 368, which outputs a token ($T_2$) 366. The decryption function (D) 368 uses a private key associated with the server 110 to decrypt the encrypted token ($Z_2$) 316. In arrangements in which the token ($T_2$) 313 (with or without the digital signature (S) 314) is received instead of the encrypted token ($Z_2$) 316, decryption using the decryption function (D) 368 is not needed.

In some arrangements in which the token ($T_2$) 366 obtained as a result of the decryption function (D) 368 has a digital signature (S) 367 (314) attached thereto or the token ($T_2$) 313 received from the client device 110 has a digital signature (S) 367 (314) attached thereto, a public key (e.g., a public certificate) associated with the client device 110 can be used to verify the digital signature (S) 367 (314) before comparison at 365. Responsive to determining that the signature fails to verify, the transaction (X=2) is rejected. In the arrangements in which the token ($T_2$) 313 is received without the digital signature (S) 367 (314), signature verification is not needed.

At 365, the server 120 compares the server-derived token ($T_2$) 364 to the received token ($T_2$) 366 in some arrangements. In some arrangements in which the token ($T_2$) 313 instead of the encrypted token ($Z_2$) 316 is received, the server 120 compares the server-derived token ($T_2$) 364 to the received token ($T_2$) 313. If the server-derived token ($T_2$) 364 is the same as the received token ($T_2$) 366 or 313, then the transaction (X=2) can be authorized.

Responsive to determining that the received token ($T_2$) 366 or 313 does not match the server-derived token ($T_2$) 364, the transaction (X=2) is rejected. Otherwise, responsive to determining that the received token ($T_2$) 366 or 313 matches the server-derived token ($T_2$) 364, the original data (C) 302 has been validated.

As shown, for a third transaction (e.g., X=3), the intermediate value ($C_2$) 311 is used as input to a first function ($F_3$) 317, which is another iteration of the first function (F). This effectively corresponds to the first function (F) being iterated three times with the original data (C) 302 as input, without storing the original data (C) 302. An intermediate value ($C_3$) 318 is the output of the first function ($F_3$) 317. The intermediate value ($C_3$) 318 is used as input to a second function (G) 319, which outputs the token ($T_3$) 320. As described herein, the second function (G) 319 can be executed one time or multiple times. The intermediate value ($C_3$) 318 replaces the intermediate value ($C_2$) 311 as the current intermediate value to be stored. The transaction counter increase by 1 (X=2). In some arrangements, the token ($T_3$) 320 is transmitted via the network 130 to the server 120 with a corresponding transaction counter (X=3) for authentication, without a digital signature or additional encryption.

In some arrangements, the client device 110 generates a digital signature (S) 321 on the token ($T_3$) 320 with a private key associated with the client device 110. In some arrangements, the token ($T_3$) 320 with the digital signature (S) 321 is transmitted via the network 130 to the server 120 with a corresponding transaction counter (X=3), without additional encryption. In some arrangements, the token ($T_3$) 320 (with or without the digital signature (S) 321) can be encrypted using any suitable encryption function (E) 322 with a public key (e.g., a public certificate) associated with the server 120. The encryption function (E) 322 outputs an encrypted token ($Z_3$) 323. In some arrangements, generating the digital signature (S) 321 and encrypting the token ($T_3$) 320 using the encryption function (E) 322 can be combined using, for example, SigncryptedData. In some arrangements, the encrypted token ($Z_3$) 323 is transmitted via the network 130 to the server 120 with a corresponding transaction counter (X=3).

The server 120 can determine the original data (C) 302 by searching for data corresponding to the unique ID 301. The transaction counter received from the client device 110 is a number of iterations that the first function (F) is executed. For example, a first function ($F_x$) 369 is executed for three iterations given that the associated transaction counter is 3 (e.g., X=3). Thus, the first function ($F_x$) 369 is synchronized with the first function ($F_3$) 317. The original data (C) 302 is used as an input to the first function ($F_x$) 369 (X=3), which outputs an intermediate value ($C_3$) 370. The intermediate value ($C_3$) 370 is used as input to second function (G) 371, which outputs a token ($T_3$) 372. As described herein, the second function (G) 371 can be executed one time or multiple times.

In some arrangements in which the encrypted token ($Z_3$) 323 is received via the network 130 from the client device 110, the server 120 inputs the encrypted token ($Z_3$) 323 into a decryption function (D) 376, which outputs a server-derived token ($T_3$) 374. The decryption function (D) 376 uses a private key associated with the server 110 to decrypt the encrypted token ($Z_3$) 323. In arrangements in which the token ($T_3$) 320 (with or without the digital signature (S) 321) is received instead of the encrypted token ($Z_3$) 323, decryption using the decryption function (D) 376 is not needed.

In some arrangements in which the server-derived token ($T_3$) 374 obtained as a result of the decryption function (D) 376 has a digital signature (S) 375 (321) attached thereto or the token ($T_3$) 320 received from the client device 110 has a digital signature (S) 375 (321) attached thereto, a public key (e.g., a public certificate) associated with the client device 110 can be used to verify the digital signature (S) 375 (321) before comparison at 373. Responsive to determining that the signature fails to verify, the transaction (X=3) is rejected. In the arrangements in which the token ($T_3$) 320 is received without the digital signature (S) 375 (321), signature verification is not needed.

At 373, the server 120 compares the server-derived token ($T_3$) 372 to the received token ($T_3$) 374 in some arrangements. In some arrangements in which the token ($T_3$) 320 instead of the encrypted token ($Z_3$) 323 is received, the server 120 compares the server-derived token ($T_3$) 372 to the received token ($T_3$) 320. If the server-derived token ($T_3$) 372 is the same as the received token ($T_3$) 374 or 320, then the transaction (X=3) can be authorized.

Responsive to determining that the received token ($T_3$) 374 or 320 does not match the server-derived token ($T_3$) 372, the transaction (X=3) is rejected. Otherwise, responsive to determining that the received token ($T_3$) 374 or 320 matches the server-derived token ($T_3$) 372, the original data (C) 302 has been validated.

As shown, for an $n^{th}$ transaction (e.g., X=n), an intermediate value ($C_{n-1}$) (not shown) is used as input to a first function ($F_n$) 324, which is another iteration of the first function (F). This effectively corresponds to the first function (F) being iterated n times with the original data (C) 302 as input. An intermediate value ($C_n$) 325 is the output of the first function ($F_n$) 324. The intermediate value ($C_n$) 325 is used as input to a second function (G) 326, which outputs the token ($T_n$) 327. As described herein, the second function (G) 326 can be executed one time or multiple times. The intermediate value ($C_n$) 325 replaces the intermediate value ($C_{n-1}$) as the current intermediate value to be stored. The transaction counter increase by 1 (X=n). In some arrangements, the token ($T_n$) 327 is transmitted via the network 130 to the server 120 with a corresponding transaction counter (X=n) for authentication, without a digital signature or additional encryption.

In some arrangements, the client device 110 generates a digital signature (S) 328 on the token ($T_n$) 327 with a private key associated with the client device 110. In some arrangements, the token ($T_n$) 327 with the digital signature (S) 328 is transmitted via the network 130 to the server 120 with a corresponding transaction counter (X=n), without additional encryption. In some arrangements, the token ($T_n$) 327 (with or without the digital signature (S) 328) can be encrypted using any suitable encryption function (E) 329 with a public key (e.g., a public certificate) associated with the server 120. The encryption function (E) 329 outputs an encrypted token (Zn) 330. In some arrangements, generating the digital signature (S) 328 and encrypting the token ($T_n$) 328 using the encryption function (E) 329 can be combined using, for example, SigncryptedData. In some arrangements, the encrypted token (Zn) 330 is transmitted via the network 130 to the server 120 with a corresponding transaction counter (X=n).

The server 120 can determine the original data (C) 302 by searching for data corresponding to the unique ID 301. The transaction counter received from the client device 110 is a number of iterations that the first function (F) is executed. For example, a first function ($F_x$) 377 is executed for n iterations given that the associated transaction counter is n (e.g., X=n). Thus, the first function ($F_x$) 377 is synchronized with the first function ($F_n$) 324. The original data (C) 302 is used as an input to the first function ($F_x$) 377 (X=n), which outputs an intermediate value ($C_n$) 378. The intermediate value ($C_n$) 378 is used as input to second function (G) 379, which outputs a server-derived token ($T_n$) 380. As described herein, the second function (G) 379 can be executed one time or multiple times.

In some arrangements in which the encrypted token (Zn) 330 is received via the network 130 from the client device 110, the server 120 inputs the encrypted token (Zn) 330 into a decryption function (D) 384, which outputs a token ($T_n$) 382. The decryption function (D) 384 uses a private key associated with the server 110 to decrypt the encrypted token (Zn) 330. In arrangements in which the token ($T_n$) 327 (with or without the digital signature (S) 328) is received instead of the encrypted token (Zn) 330, decryption using the decryption function (D) 384 is not needed.

In some arrangements in which the token ($T_n$) 382 obtained as a result of the decryption function (D) 384 has a digital signature (S) 383 (328) attached thereto or the token ($T_n$) 327 received from the client device 110 has a digital signature (S) 383 (328) attached thereto, a public key (e.g., a public certificate) associated with the client device 110 can be used to verify the digital signature (S) 383 (328) before comparison at 381. Responsive to determining that the signature fails to verify, the transaction (X=n) is rejected. In the arrangements in which the token ($T_n$) 327 is received without the digital signature (S) 383 (328), signature verification is not needed.

At 381, the server 120 compares the server-derived token ($T_n$) 380 to the received token ($T_n$) 382 in some arrangements. In some arrangements in which the token ($T_n$) 327 instead of the encrypted token (Zn) 330 is received, the server 120 compares the server-derived token ($T_n$) 380 to the received token ($T_n$) 327. If the server-derived token ($T_n$) 380 is the same as the received token ($T_n$) 384 or 327, then the transaction (X=n) can be authorized.

Responsive to determining that the received token ($T_n$) 382 or 327 does not match the server-derived token ($T_n$) 380, the transaction (X=n) is rejected. Otherwise, responsive to determining that the received token ($T_n$) 382 or 327 matches the server-derived token ($T_n$) 380, the original data (C) 302 has been validated.

Figure 4:
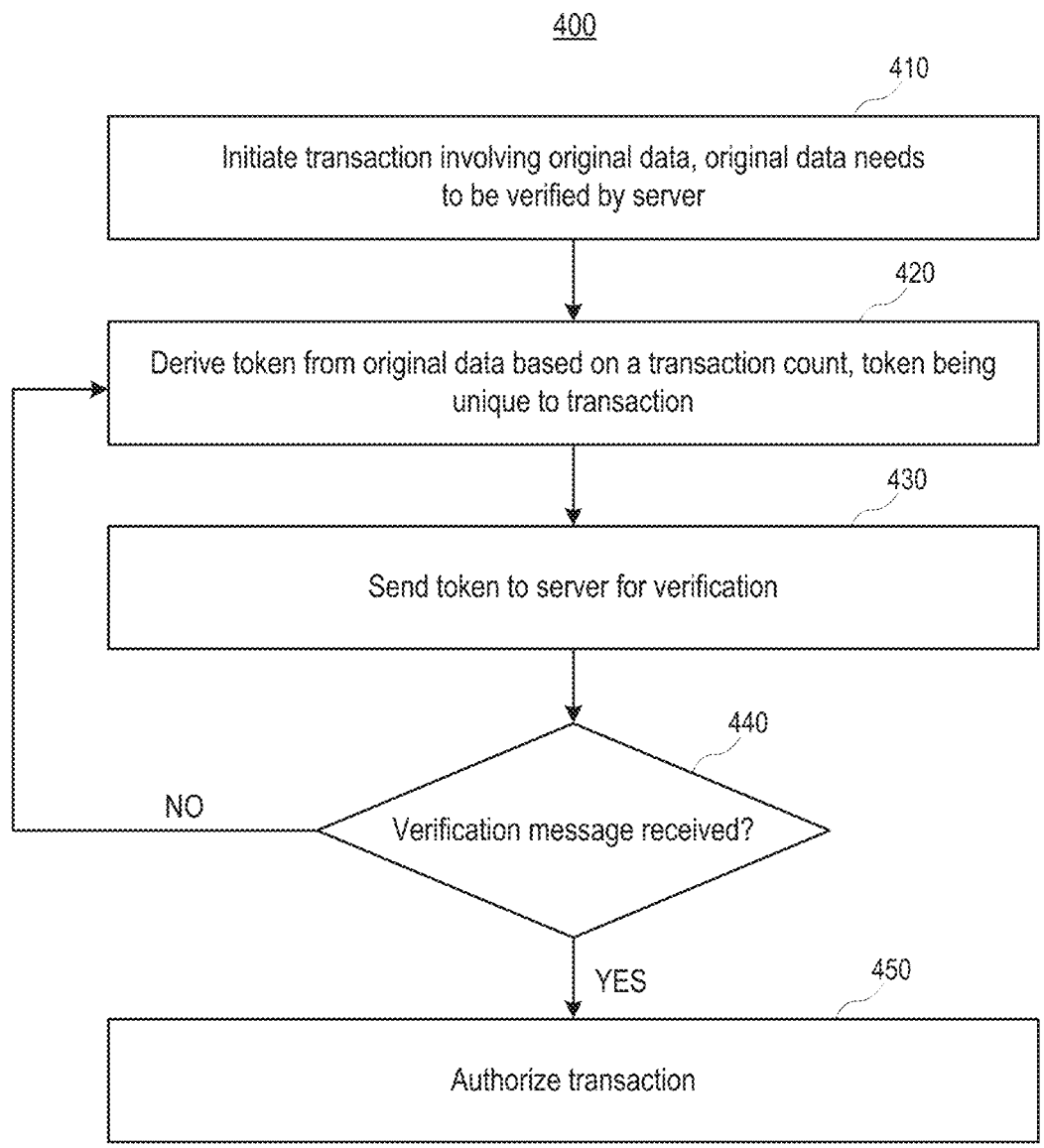
FIG. 4 is a flow diagram illustrating a method for generating, communicating, and verifying tokens between a client device and a server, according to various arrangements.

FIG. 4 is a flow diagram illustrating a method 400 for generating, communicating, and verifying tokens between the client device 110 (FIGS. 1 and 2A) and the server (FIGS. 1 and 2B), according to various arrangements. Referring to FIGS. 1-4, the method 400 is executed by the client device 110 in some arrangements. Each of blocks 410-450 corresponds to one or more of the blocks 301-330.

At 410, the client device 110 initiates a transaction involving the original data (C) 302. The original data (C) 302 needs to be verified by the server 120. In some examples, the original data (C) 302 itself can be tokenized prior to being used to derive the tokens in the manner described. Illustrating with a non-limiting example, the transaction may be the second transaction (X=2) involving the original data (C) 302, with a corresponding transaction counter of 2.

At 420, the client device 110 derives a token (e.g., the token ($T_2$) 313 or the encrypted token ($Z_2$) 316) from the original data (C) 302 for the transaction (X=2) based on a transaction count (e.g., 2). The transaction count indicates a number of times (including the current transaction) that the original data (C) 302 is involved in transactions. The token 313 or 316 is unique to the transaction.

In some arrangements, the client device 110 runs a first one-way function (e.g., the first function ($F_2$) 310) with a previous intermediate value (e.g., the intermediate value ($C_1$) 304) as input to determine a first intermediate value (e.g., the intermediate value ($C_2$) 311). In some arrangements, upon a new intermediate value (e.g., the intermediate value ($C_2$) 311) being determined, a previous intermediate value (e.g., the intermediate value ($C_1$) 304) used as input can be deleted, such that only the most current intermediate value is stored on the client device 110. Thus, the token ($T_2$)

313 or the encrypted token ($Z_2$) 316 is derived indirectly from the original data (C) 302, given that the original data (C) 302 is not stored on the client device 110 at this point. In some arrangements, the client device 110 runs a second one-way function (e.g., the second function (G) 312) with the first intermediate value as input to determine the token (e.g., the token ($T_2$) 313). In some arrangements, a digital signature (e.g., the digital signature (S) 314) is generated on the token ($T_2$) 313. In other arrangements, instead of a digital signature, a Time Stamp Token (TST) is used such that an independent reliable timestamp might be used to avoid token replay. In such arrangements, the server 120 can check the TST to determine a time at which the token ($T_2$) 313 is generated to determine whether the token ($T_2$) 313 has been used previously. For example, the server 120 can determine a generation time associated with the TST of token ($T_2$) 313 and comparing it to a threshold time interval. Upon determining that the token ($T_2$) 313 is generated earlier than the threshold time interval from a current time, the token ($T_2$) 313 can be determined to be stale and/or used previously. In some arrangements, the token ($T_2$) 313 is encrypted using the encryption function (E) 315, which outputs the encrypted token ($Z_2$) 316.

At 430, the client device 110 sends the token 313 or 316 to the server 110 for verification via the network 130. In some arrangements, the client device 110 sends the unique ID 301 to the server 120 with the token 313 or 316. In some arrangements, the client device 110 sends the transaction count (e.g., 2) to the server 120.

At 440, the client device 110 determines whether a verification message has been received from the server 120. In some arrangements, the verification message can contain an authorization code indicating authorization for the transaction (X=2). In response to determining that the verification message has not been received (440:NO) or a verification failure message has been received, the method 400 returns to 420 or ends. In response to determining that the verification message has been received, the client device 110 can authorize the transaction (X=2) based on the verification message at 450. For example, client device 110 can process payment using the payment card number.

The method 400 can be repeated for a subsequent transaction (X=n). For example, the client device 110 can initiate another transaction involving the original data (C) 302. The client device 110 derives a token (e.g., the token ($T_n$) 327 or the encrypted token (Zn) 330) from the original data (C) 302 for the transaction (X=n) in the manner described. The token 327 or 330 is unique to the transaction (X=n).

The client device 110 sends the another token 327 or 330 to the server 110 for verification 430 via the network 130. In some arrangements, the client device 110 sends the unique ID 301 to the server 120 with the another token 327 or 330. In some arrangements, the client device 110 sends a transaction count (e.g., n) to the server 120.

The client device 110 determines whether a verification message has been received from the server 120 in the manner described. In response to determining that the verification message has not been received or a verification failure message has been received, the method 400 returns to 420 or ends. In response to determining that the verification message has been received, the client device 110 can authorize the transaction (X=n) based on the verification message.

Figure 5:
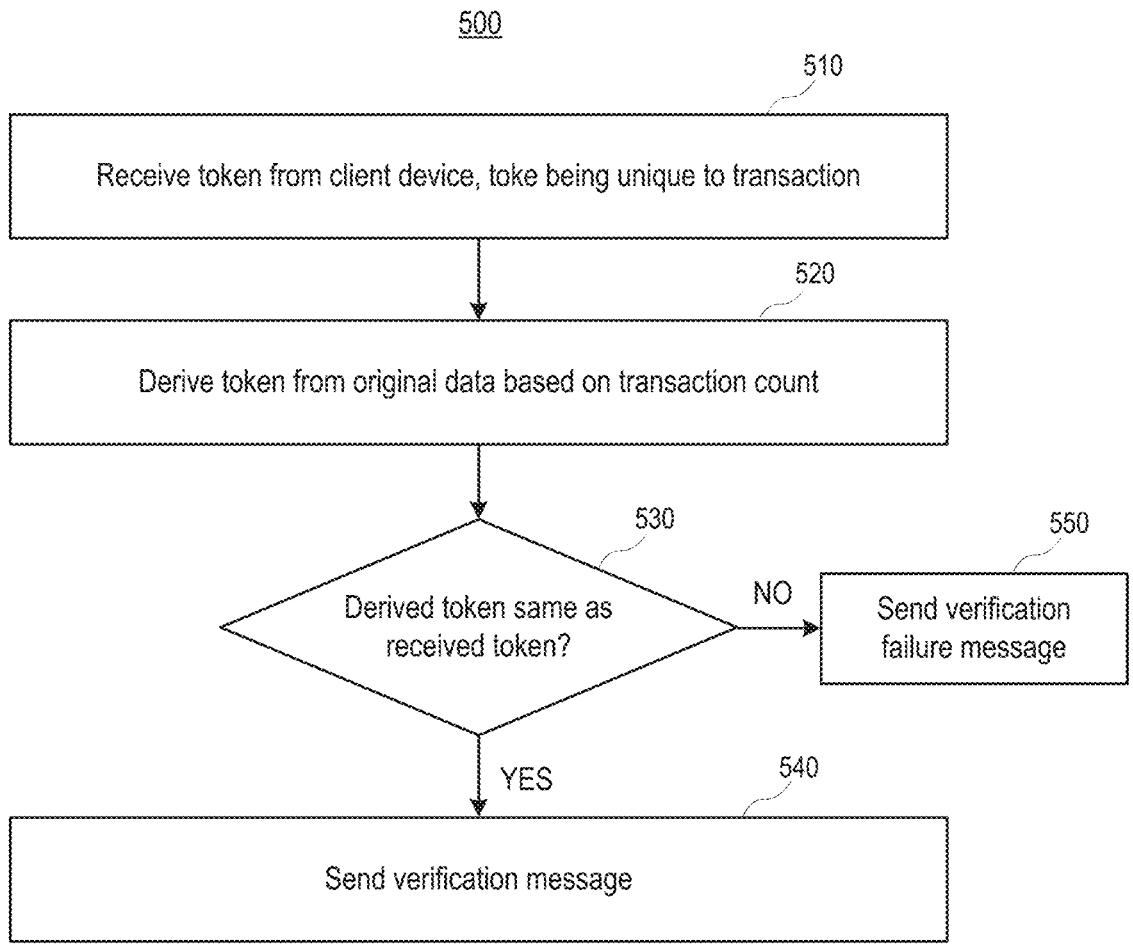
FIG. 5 is a flow diagram illustrating a method for generating, communicating, and verifying tokens between a client device and a server, according to various arrangements.

FIG. 5 is a flow diagram illustrating a method 500 for generating, communicating, and verifying tokens between the client device 110 (FIGS. 1 and 2A) and the server (FIGS. 1 and 2B), according to various arrangements. Referring to FIGS. 1-5, the method 500 is executed by the server 120 in some arrangements. Each of blocks 510-550 corresponds to one or more of the blocks 301, 302, and 353-377. In some arrangements, the server 120 receives, from the client device 110, the unique ID 301 associated with a token (e.g., the token 313 or 316). The server 120 determines the original data (C) 302 that correspond to the unique ID 301.

At 510, the server 120 receives the token (e.g., the token 313 or 316) from the client device 110. The token 313 or 316 is unique to the transaction (X=2). In some arrangements, the server 120 receives a transaction count (e.g., 2) that corresponds to a number of transaction (including the current transaction) involving the original data (C) 302.

At 520, the server 120 derives a server-derived token (e.g., the token ($T_2$) 364) from the original data (C) 302 based on a transaction count. In some arrangements, the server 120 runs a number of iterations of the first one-way function (e.g., the first function ($F_x$) 361, where X=2) with the original data (C) 302 as input to determine a third intermediate value (e.g., the intermediate value ($C_2$) 362). The number of iterations is the same as the transaction count. In some arrangements, the server 120 runs a second one-way function (e.g., the second function (G) 363) with the third intermediate value as input to determine the server-derived token (e.g., the token ($T_2$) 364).

At 530, the server 120 determines whether the server-derived token 364 is the same as the received token 313 or 316. For example, server 120 compares the received token 313 or 316 to the server-derived token 364 at 365. At 540, in response to determining that the server-derived token 364 is the same as the received token 313 or 316 (540:YES), the server 120 sends a verification message to the client 110. At 550, in response to determining that the server-derived token 364 is not the same as the received token 313 or 316 (540:NO), the server 120 sends a verification failure message to the client 110.

The method 500 can be repeated for a subsequent transaction (X=n). For example, the server 120 receives another token (e.g., the token 327 or 330) from the client device 110. The another token 327 or 330 is unique to another transaction (X=n). The server 120 receives a transaction count (e.g., n). The first one-way function (e.g., the first function ($F_n$) 324) is run by the client device 110 for a number of iterations equal to the transaction count. The server 120 derives another server-derived token (e.g., the token ($T_n$) 380) from the original data (C) 302 based on the transaction count.

For example, in some arrangements, the server 120 runs a number of iterations of the first one-way function (e.g., the first function ($F_x$) 377, where X=n) with the original data (C) 302 as input to determine a fourth intermediate value (e.g., the intermediate value ($C_n$) 378). The number of iterations equals to the transaction count. In some arrangements, the server 120 runs the second one-way function (e.g., the second function (G) 379) with the fourth intermediate value 378 as input to determine the another token (e.g., the token ($T_n$) 382).

In some arrangements, the server 120 compares the another received token 327 or 330 to the another server-derived token 380. Responsive to determining that the another received token 327 or 330 and the another server-derived token 380 are same, the server 120 sends another verification message. In response to determining that the server-derived token 380 is not the same as the received token 327 or 330, the server 120 sends another verification failure message to the client 110. In some arrangements, the server 120 can reject a token in response to determining one or more of the unique ID 301 received from the client device 110 is unknown, the transaction count received from the client device 110 is fake, and the token is fake. In some arrangements, the server 120 stores a record of the transaction count in relation to the unique ID 301 and/or the original data (C) 302. Tokens used earlier cannot be reused. However, a gap in the transaction count does necessarily not indicate fraud, due to the possibility that the missing transaction counts were verified at another server.

In the arrangements described, the tokens are used in lieu of the original data from which the tokens are derived. To route payments, a mechanism to prove the tokenization mechanism described herein can be used. For example, a unique identifier that uniquely identifies a financial institution can be used for routing payments.

In some arrangements, the apparatuses, systems, and methods can be used for security object (e.g., symmetric keys, AES keys, and the like) synchronization. Illustrating with a non-limiting example, a first seed can be generated by the client 110. The first seed can be tokenized using the first function (F) and the second function (G) as described. The token can be sent to the server 120 for verification. Upon verification, the server 120 has knowledge of the seed that the client device 110 is currently using to generate a security object. The server 120 can likewise generate the same security object using the seed. The security object can also be generated using the seed or an intermediate value (e.g., the output of a number of iterations of the first function (F)).

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for using tokens between two entities comprising a client device and a server, the method comprising:
   generating, by a first one-way function of a client device, a first intermediate value from a number of transactions, the first intermediate value corresponding to a first verification transaction at a server;
   generating, by a second one-way function of the client device, a second intermediate value from the first intermediate value, the second intermediate value corresponding to a second verification transaction at the server;
   causing, by the client device and based on the first intermediate value, the server to execute the first verification transaction; and
   causing, by the client device and based on the second intermediate value, the server to execute the second verification transaction.
2. The method of claim 1, further comprising:
   generating, by a first verification function of the client device, a first token from the first intermediate value.
3. The method of claim 2, further comprising:
   encrypting the first token.
4. The method of claim 3, further comprising:
   deleting, by the client device, the first intermediate value after the generating the second intermediate value.
5. The method of claim 2, further comprising:
   generating, by the client device, a first digital signature associated with the first token from a private key associated with the client device.
6. The method of claim 1, further comprising:
   generating, by a second verification function of the client device, a second token from the second intermediate value.
7. The method of claim 6, further comprising:
   encrypting the second token.
8. The method of claim 6, further comprising:
   generating, by the client device, a second digital signature associated with the second token from the private key.
9. The method of claim 1, wherein the number of transactions corresponds to an original data that comprises one or more of a payment card number, a financial account number, a password, a social security number, a name, an address, an email address, any Personally Identifiable Information (PII), a security object, and a seed for key-generation.
10. The method of claim 9, further comprising:
    deleting, by the client device, the original data after the generating the first intermediate value.
11. The method of claim 1, wherein the number of transactions corresponds to an original data that comprises one or more of a payment card number, a financial account number, a password, a social security number, a name, an address, an email address, any Personally Identifiable Information (PII), a security object, and a seed for key-generation.
12. A client device, comprising:
    a network interface; and
    a processing circuit configured to:
       generate, by a first one-way function of a client device, a first intermediate value from a number of transactions, the first intermediate value corresponding to a first verification transaction at a server;
       generate, by a second one-way function of the client device, a second intermediate value from the first intermediate value, the second intermediate value corresponding to a second verification transaction at the server;
       cause, by the client device and based on the first intermediate value, the server to execute the first verification transaction; and
       cause, by the client device and based on the second intermediate value, the server to execute the second verification transaction.
13. The device of claim 12, wherein the processing circuit is further configured to:
    generate, by a first verification function of the client device, a first token from the first intermediate value.
14. The device of claim 13, wherein the processing circuit is further configured to:
    encrypt the first token.
15. The device of claim 13, wherein the processing circuit is further configured to:
    generate, by the client device, a first digital signature associated with the first token from a private key associated with the client device.
16. The device of claim 12, wherein the processing circuit is further configured to:
    generate, by a second verification function of the client device, a second token from the second intermediate value.

17. The device of claim 16, wherein the processing circuit is further configured to:
  encrypt the second token.

18. The device of claim 16, wherein the processing circuit is further configured to:
  generate, by the client device, a second digital signature associated with the second token from the private key.

19. A server, comprising:
  a network interface; and
  a processing circuit configured to:
    receive, at the server, a first token based on a first intermediate value, the first intermediate value being based on a number of transactions, the first intermediate value corresponding to a first verification transaction at the server, and the first intermediate value being generated by a first one-way function of the client device;
    receive, at the server, a second token based on the second intermediate value, the second intermediate value being based on the first intermediate value, the second intermediate value corresponding to a second verification transaction at the server, and the second intermediate value being generated by a second one-way function of the client device;
    execute a first verification transaction based on the first token; and
    execute a second verification transaction based on the second token.

20. The server of claim 19, wherein the number of transactions corresponds to an original data that comprises one or more of a payment card number, a financial account number, a password, a social security number, a name, an address, an email address, any Personally Identifiable Information (PII), a security object, and a seed for key-generation.

* * * * *